US011163125B2

(12) United States Patent
Morioka et al.

(10) Patent No.: US 11,163,125 B2
(45) Date of Patent: Nov. 2, 2021

(54) OPTICAL RECEPTACLE AND OPTICAL MODULE

(71) Applicant: Enplas Corporation, Saitama (JP)

(72) Inventors: Shimpei Morioka, Saitama (JP); Ayano Kon, Saitama (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 16/626,523

(22) PCT Filed: May 9, 2018

(86) PCT No.: PCT/JP2018/017961
§ 371 (c)(1),
(2) Date: Dec. 25, 2019

(87) PCT Pub. No.: WO2019/003652
PCT Pub. Date: Jan. 3, 2019

(65) Prior Publication Data
US 2020/0241223 A1    Jul. 30, 2020

(30) Foreign Application Priority Data

Jun. 28, 2017 (JP) .............................. JP2017-126188

(51) Int. Cl.
*G02B 6/42* (2006.01)
(52) U.S. Cl.
CPC .......... *G02B 6/4214* (2013.01); *G02B 6/425* (2013.01); *G02B 6/4206* (2013.01)
(58) Field of Classification Search
CPC ...... G02B 6/42; G02B 6/4214; G02B 6/4206; G02B 6/425; G02B 6/00

(Continued)

(56) References Cited

U.S. PATENT DOCUMENTS 5,565,978 A * 10/1996 Okubo ................... G01N 21/43
356/128
7,463,339 B2 * 12/2008 Hinderling .............. G01S 7/486
356/5.01

(Continued)

FOREIGN PATENT DOCUMENTS

| JP | 2006-344915 | 12/2006 |
| WO | WO 2011/077723 | 6/2011 |
| WO | WO 2019/003652 | 1/2019 |

OTHER PUBLICATIONS

International Search Report and the Written Opinion dated Aug. 14, 2018 From the International Searching Authority Re. Application No. PCT/JP2018/017961 and Its Translation of Search Report Into English. (9 Pages).

*Primary Examiner* — Kaveh C Kianni

(57) ABSTRACT

This optical receptacle includes: first, second, and third optical surfaces disposed on a first surface that faces a photoelectric conversion device; fourth and fifth optical surfaces that are disposed on a second surface that faces an optical transmission body; a first reflection surface that is disposed on an optical path between the first optical surface and the fifth optical surface; a second reflection surface that is disposed on an optical path between the second optical surface and the fourth optical surface; and an inclined surface that is disposed between the first reflection surface and the fifth optical surface on an optical path between the first optical surface and the fifth optical surface. The inclined surface functions as a transmissive surface when covered by a light-transmissive material, and functions as a reflective surface when not covered by a light-transmissive material.

5 Claims, 3 Drawing Sheets

(58) Field of Classification Search
USPC .......................................................... 385/31
See application file for complete search history.

(56) References Cited

U.S. PATENT DOCUMENTS

| | | | | |
|---|---|---|---|---|
| 8,235,605 B2* | 8/2012 | Kim | ................... | H01S 5/02255 385/92 |
| 2002/0131180 A1* | 9/2002 | Goodman | .......... | G02B 6/29367 359/634 |
| 2010/0278480 A1* | 11/2010 | Vasylyev | ............. | G02B 6/0063 385/33 |
| 2011/0152790 A1* | 6/2011 | Dacey, Jr. | ................. | A61F 2/30 604/265 |
| 2012/0263416 A1 | 10/2012 | Morioka | | |
| 2013/0266260 A1* | 10/2013 | Morioka | ............. | G02B 6/4249 385/33 |
| 2014/0110570 A1* | 4/2014 | Morioka | ................ | G02B 6/425 250/216 |
| 2014/0270662 A1* | 9/2014 | Morioka | .............. | G02B 6/4204 385/93 |
| 2014/0328558 A1* | 11/2014 | Morioka | .............. | G02B 6/4214 385/33 |
| 2015/0030286 A1 | 1/2015 | Lin | | |
| 2015/0131947 A1* | 5/2015 | Morioka | .............. | G02B 6/4206 385/93 |
| 2015/0331211 A1* | 11/2015 | Kuo | ....................... | G02B 6/428 385/14 |
| 2015/0338590 A1* | 11/2015 | Morioka | ................ | G02B 6/32 385/33 |
| 2016/0202430 A1* | 7/2016 | de Jong | ................... | G02B 6/32 385/33 |
| 2018/0356341 A1* | 12/2018 | Muldoon | ............... | G01N 21/65 |
| 2021/0063630 A1* | 3/2021 | Vasylyev | ............. | G02B 6/0038 |

* cited by examiner

OPTICAL RECEPTACLE AND OPTICAL MODULE

TECHNICAL FIELD

The present invention relates to an optical receptacle, and an optical module including the optical receptacle.

BACKGROUND ART

Conventionally, in optical communications using an optical transmission member such as an optical fiber and a light waveguide, an optical module including a photoelectric conversion device and an optical receptacle is used. Transmitting optical modules use a photoelectric conversion device including a light emitting element as a photoelectric conversion element, and receiving optical modules use a photoelectric conversion device including a light receiving element as a photoelectric conversion element. In addition, transmitting-and-receiving optical modules use a photoelectric conversion device including both a light emitting element and a light receiving element. Both a transmitting optical transmission member and a receiving optical transmission member are connected to such a transmitting-and-receiving optical module (see, for example, PTL 1).

FIG. 1 is a schematic sectional view illustrating a configuration of optical module (optical transceiver) 10 disclosed in PTL 1. As illustrated in FIG. 1, optical module 10 disclosed in PTL 1 includes photoelectric conversion device 20 and optical receptacle (optical member) 30. Four receiving optical fibers 41 disposed in a line on the upper side, and four transmitting optical fibers 42 disposed in a line on the lower side are connected to optical module 10. The eight optical fibers are integrated with each other by means of an optical connector not illustrated in the drawing. Photoelectric conversion device 20 includes substrate 21, four transmitting light emitting elements (VCSEL) 22 disposed in a line on substrate 21, four light receiving elements (PD) 23 for automatic light quantity control disposed in a line on substrate 21, and four receiving light receiving elements (PD) 24 disposed in a line on substrate 21. Optical receptacle 30 includes four collimator lenses 31 configured to convert light from light emitting element 22 into parallel light, total reflection mirror 32, four condenser lenses 33 configured to emit, toward the end surface of transmitting optical fiber 42, light entered from collimator lens 31 and reflected by total reflection mirror 32, four collimator lenses 34 configured to convert light emitted from the end surface of receiving optical fiber 41 into parallel light, and condenser lens 35 configured to emit, toward receiving light receiving element 24, light entered from collimator lens 34 and reflected by total reflection mirror 32.

As illustrated in FIG. 1, in optical module 10 disclosed in PTL 1, the four transmitting light emitting elements 22 and four receiving light receiving elements 24 in photoelectric conversion device 20 are disposed at respective positions corresponding to the positions of four transmitting optical fibers 42 and four receiving optical fibers 41 in the optical connector. In other words, four transmitting optical fibers 42 and four receiving optical fibers 41 in the optical connector are disposed at respective positions corresponding to the positions of four transmitting light emitting elements 22 and four receiving light receiving elements 24 in the photoelectric conversion device 20.

CITATION LIST

Patent Literature

PTL 1
Japanese Patent Application Laid-Open No. 2006-344915

SUMMARY OF INVENTION

Technical Problem

In optical module 10 disclosed in PTL 1, when four receiving optical fibers 41 are disposed on the lower side and four transmitting optical fibers 42 are disposed on the upper side in the optical connector (in a manner opposite the state illustrated in FIG. 1), the position of four transmitting light emitting elements 22 has to be nearer to the optical connector than four receiving light receiving elements 24 in photoelectric conversion device 20. In other words, when the positions of transmitting optical fiber 42 and receiving optical fiber 41 are changed in the optical connector, the positions of light emitting element 22 and receiving light receiving element 24 in photoelectric conversion device 20 have to be accordingly changed.

As a result, in optical module 10 disclosed in PTL 1, (1) photoelectric conversion devices 20 of two types have to be prepared in accordance with the positions of transmitting optical fiber 42 and receiving optical fiber 41 in in the optical connector. In addition, instead of preparing photoelectric conversion devices 20 of two types, it may be conceivable to (2) prepare optical receptacles 30 of two types, or (3) forcibly change the positions of transmitting optical fiber 42 and receiving optical fiber 41 in the optical connector by twisting the optical fiber. However, the cases (1) and (2) result in increase in manufacturing cost of optical module 10. Also, in the case (3), the optical fiber is easily damaged, and the size of the optical module is increased.

An object of the present invention is to provide an optical receptacle capable of optically coupling the photoelectric conversion element (the light emitting element or the light receiving element) of the photoelectric conversion device and the end surface of the optical transmission member without changing the configuration of the photoelectric conversion device even when the positions of the transmitting optical transmission member and the receiving optical transmission member are changed. In addition, another object of the present invention is to provide an optical module including the optical receptacle.

Solution to Problem

An optical receptacle according to an embodiment of the present invention is configured for optically coupling a light emitting element or a light receiving element of a photoelectric conversion device and at least one of end surfaces of a plurality of optical transmission members when the optical receptacle is disposed between the photoelectric conversion device and the plurality of optical transmission members, the optical receptacle including at least one first optical surface disposed in a line in a first surface, the first surface being opposite to the photoelectric conversion device when the optical receptacle is disposed between the photoelectric conversion device and the plurality of optical transmission members; at least one second optical surface disposed in a line in the first surface in parallel to a line of the first optical surface; at least one third optical surface disposed in a line in the first surface in parallel to the line of the first optical surface; at least one fourth optical surface disposed in a line in a second surface, the second surface being opposite to the plurality of optical transmission members when the optical receptacle is disposed between the photoelectric conversion device and the plurality of optical transmission members; at least one fifth optical surface disposed in a line in the second surface in parallel to a line of the fourth optical surface; a first reflection surface disposed on a light path between the first optical surface and the fifth optical surface, the first reflection surface being configured to reflect, toward the fifth optical surface, light entered from the first optical surface, or reflect, toward the first optical surface, light entered from the fifth optical surface; a second reflection surface disposed on a light path between the second optical surface and the fourth optical surface, the second reflection surface being configured to reflect, toward the fourth optical surface, light entered from the second optical surface, or reflect, toward the second optical surface, light entered from the fourth optical surface; and an inclined surface disposed between the first reflection surface and the fifth optical surface on the light path between the first optical surface and the fifth optical surface. The inclined surface functions as a transmission surface when the inclined surface is covered with an optically transparent material. The inclined surface functions as a reflection surface when the inclined surface is not covered with the optically transparent material. When the inclined surface functions as the reflection surface, the inclined surface reflects, toward the fifth optical surface, light entered from the third optical surface, and reflects, toward the third optical surface, the light entered from the fifth optical surface. When the inclined surface functions as the transmission surface, the inclined surface allows, to pass through the inclined surface toward the fifth optical surface, light entered from the first optical surface and reflected by the first reflection surface, and allows, to pass through the inclined surface toward the first reflection surface, the light entered from the fifth optical surface.

An optical module according to an embodiment of the present invention includes a photoelectric conversion device including a substrate, at least one light emitting element disposed in a line on the substrate, and at least one light receiving element disposed in a line on the substrate in parallel to a line of the light emitting element; and the above-mentioned optical receptacle. The line of the light emitting element, a line of the light receiving element, a line of the first optical surface, a line of the second optical surface and a line of the third optical surface are parallel to each other.

Advantageous Effects of Invention

According to the present invention, it is possible to optically couple the photoelectric conversion element (the light emitting element or the light receiving element) of the photoelectric conversion device and the end surface of the optical transmission member without changing the configuration of the photoelectric conversion device even when the positions of the transmitting optical transmission member and the receiving optical transmission member are changed.

DESCRIPTION OF EMBODIMENTS

An embodiment of the present invention is elaborated below with reference to the accompanying drawings.

Configuration of Optical Module

Figure 1:
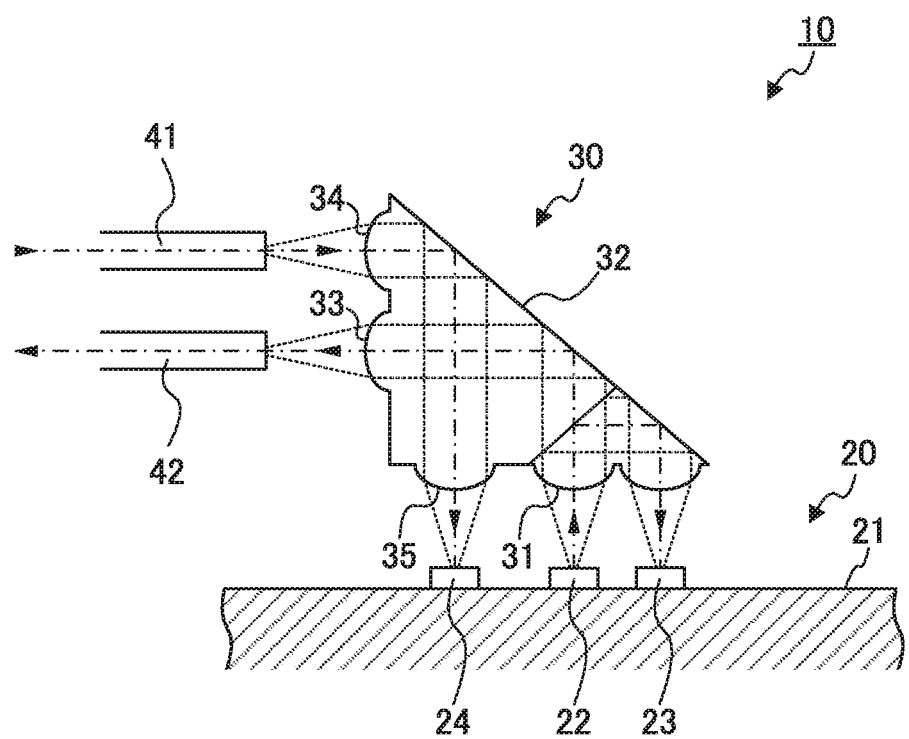
FIG. 1 is a schematic sectional view illustrating a configuration of an optical module disclosed in PTL 1.
Figure 2:
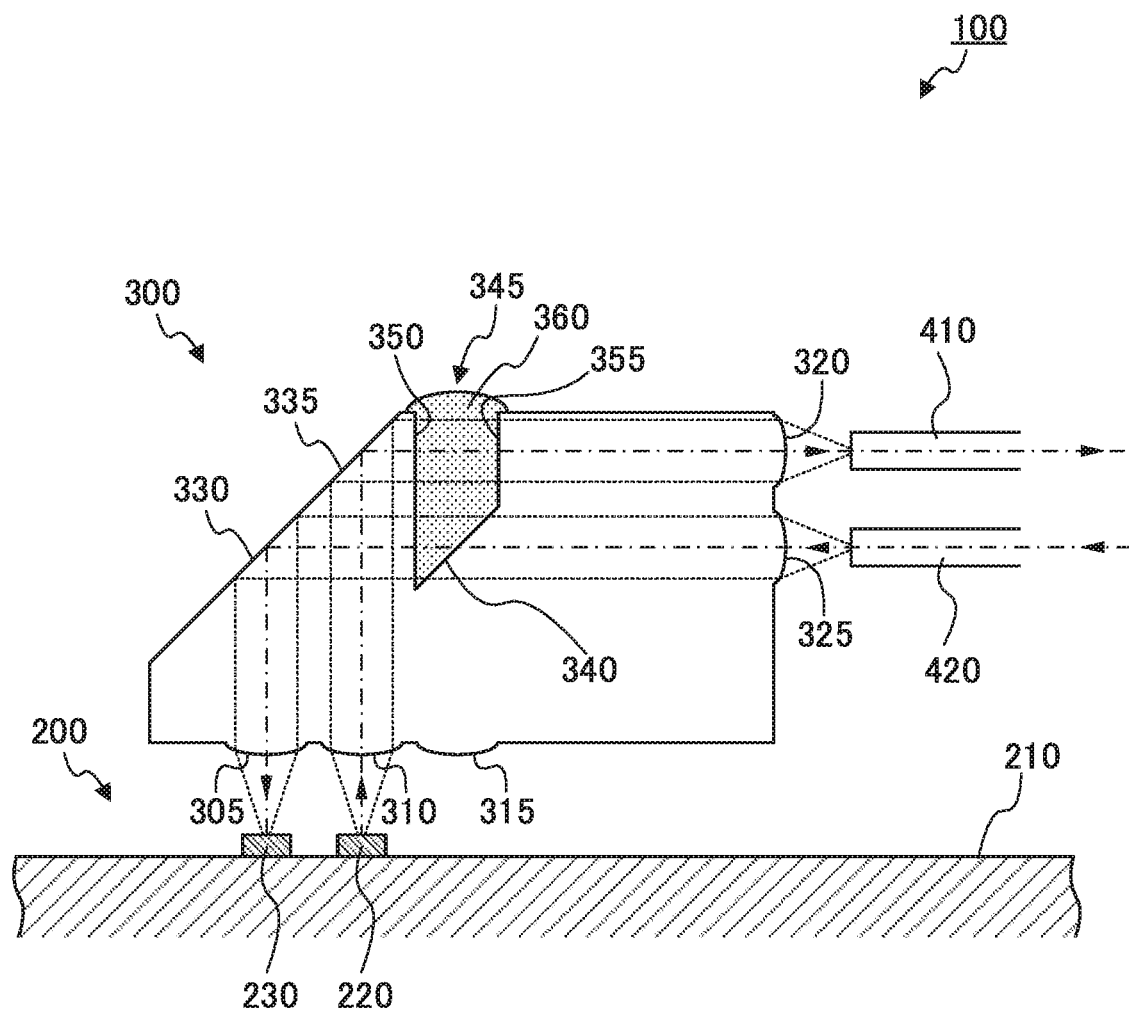
FIG. 2 is a schematic sectional view illustrating a configuration of an optical module according to an embodiment of the present invention.
Figure 3:
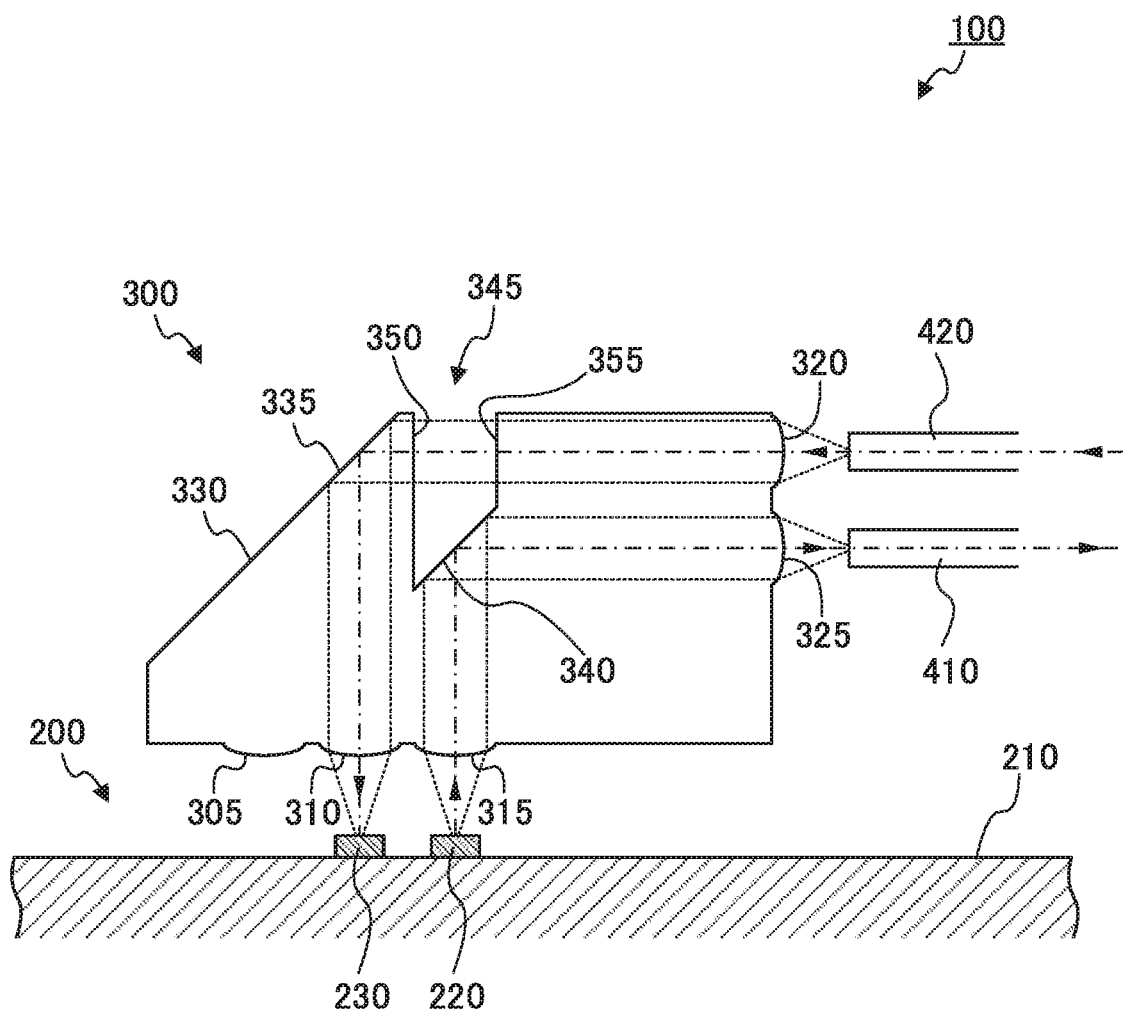
FIG. 3 is a schematic sectional view illustrating a configuration of the optical module according to the embodiment of the present invention.

FIG. 2 and FIG. 3 are sectional views schematically illustrating a configuration of optical module 100 according to an embodiment of the present invention. Recess 345 is filled with optically transparent material 360 in optical receptacle 300 of FIG. 2, whereas recess 345 is not filled with optically transparent material 360 in optical receptacle 300 of FIG. 3. In addition, FIG. 2 and FIG. 3 differ from each other in the relative positional relationship of photoelectric conversion device 200 and optical receptacle 300. Further, FIG. 2 and FIG. 3 differ from each other also in the relative positional relationship of optical receptacle 300 and optical transmission members 410 and 420. In FIG. 2 and FIG. 3, the hatching on the cross-section of optical receptacle 300 and optical transmission members 410 and 420 is omitted to illustrate light paths. In FIG. 2 and FIG. 3, the dashed line represents the optical axis, and the broken line represents the outer diameter of light.

As illustrated in FIG. 2 and FIG. 3, optical module 100 includes photoelectric conversion device 200 and optical receptacle 300. Optical module 100 according to the present embodiment is a receiving-and-transmitting optical module. Optical module 100 is used in the state where four transmitting optical transmission members 410 and four receiving optical transmission members 420 are connected to optical receptacle 300. Four transmitting optical transmission members 410 are disposed in a line in the depth direction of FIG. 2 and FIG. 3, and four receiving optical transmission members 420 are disposed in a line in the depth direction of FIG. 2 and FIG. 3. In the example illustrated in FIG. 2, four transmitting optical transmission members 410 are disposed on the upper side, and four receiving optical transmission members 420 are disposed on the lower side. On the other hand, in the example illustrated in FIG. 3, four transmitting optical transmission members 410 are disposed on the lower side, and four receiving optical transmission members 420 are disposed on the upper side. The eight optical fibers are integrated with each other by means of an optical connector not illustrated in the drawing.

Photoelectric conversion device 200 includes substrate 210, four light emitting elements 220 and four light receiving elements 230.

Substrate 210 supports light emitting element 220, light receiving element 230 and optical receptacle 300. Substrate 210 is, for example, a glass composite substrate, a glass epoxy substrate, or a flexible substrate.

Four light emitting elements 220 are disposed in a line on substrate 210. Four light emitting elements 220 are disposed in a line in the depth direction in FIG. 2 and FIG. 3. Each light emitting element 220 emits transmission light in a direction perpendicular to the surface of substrate 210. The transmission light reaches the end surface of transmitting optical transmission member 410 through the interior of optical receptacle 300. The type of light emitting element 220 is not limited. Light emitting element 220 is, for example, a vertical-cavity surface-emitting laser (VCSEL).

Four light receiving elements 230 are disposed on substrate 210 in a line in parallel to the line of light emitting elements 220. Four light receiving elements 230 are disposed in a line in the depth direction in FIG. 2 and FIG. 3. In the present embodiment, light emitting element 220 and light receiving element 230 are disposed on substrate 210 such that light emitting element 220 is nearer to optical transmission members 410 and 420 than light receiving element 230. Each light receiving element 230 detects reception light emitted from the end surface of receiving optical transmission member 420 past the interior of optical receptacle 300. The type of light receiving element 230 is not limited. Light receiving element 230 is a photodiode (PD), for example.

In the state where optical receptacle 300 is disposed between photoelectric conversion device 200 and the plurality of optical transmission members 410 and 420, optical receptacle 300 optically couples light emitting element 220 and the end surface of transmitting optical transmission member 410, and optically couples light receiving element 230 and the end surface of receiving optical transmission member 420. Optical receptacle 300 is formed with the material that is optically transparent to the light of the wavelength used in the optical communication. Examples of such a material include transparent resins such as polyetherimide (PEI) and cyclic olefin resin. The configuration of optical receptacle 300 is elaborated later. For example, optical receptacle 300 is fixed to substrate 210 by means of a publicly known fixing member such as adhesive agent (e.g., thermosetting resin or ultraviolet curing resin).

Four transmitting optical transmission members 410 and four receiving optical transmission members 420 are attached to optical receptacle 300 by means of a publicly known attaching member in the state where four transmitting optical transmission members 410 and four receiving optical transmission members 420 are housed in an optical connector (not illustrated in the drawing) of a multicore package type. As described above, in the example illustrated in FIG. 2, four transmitting optical transmission members 410 are disposed on the upper side, and four receiving optical transmission members 420 are disposed on the lower side. In the example illustrated in FIG. 3, four transmitting optical transmission members 410 are disposed on the lower side, and four receiving optical transmission members 420 are disposed on the upper side. The type of optical transmission members 410 and 420 is not limited. Examples of the type of optical transmission members 410 and 420 include an optical fiber and a light waveguide. In the present embodiment, optical transmission members 410 and 420 are optical fibers. In addition, the optical fiber may be of a single mode type, or a multiple mode type.

Configuration of Optical Receptacle

Next, a configuration of optical receptacle 300 is described. As illustrated in FIG. 2 and FIG. 3, optical receptacle 300 includes four first optical surfaces 305, four second optical surfaces 310, four third optical surfaces 315, four fourth optical surfaces 320, four fifth optical surfaces 325, first reflection surface 330, second reflection surface 335 and inclined surface 340. First optical surface 305, second optical surface 310 and third optical surface 315 are disposed in a first surface (bottom surface) of optical receptacle 300 so as to be opposite to the photoelectric conversion device. Fourth optical surface 320 and fifth optical surface 325 are disposed in a second surface (front surface) of optical receptacle 300 so as to be opposite to optical transmission members 410 and 420.

In the present embodiment, inclined surface 340 is a part of an inner surface of recess 345 that opens at the top surface of optical receptacle 300. Of the inner surfaces of recess 345, the substantially perpendicular surface nearer to first reflection surface 330 and second reflection surface 335 functions as first transmission surface 350, and the substantially perpendicular surface nearer to fourth optical surface 320 and fifth optical surface 325 functions as second transmission surface 355. As illustrated in FIG. 2 and FIG. 3, whether recess 345 is filled with optically transparent material 360 depends on the use mode.

Four first optical surfaces 305 are disposed in a line in the first surface (bottom surface) of optical receptacle 300. Four first optical surfaces 305 are disposed in a line in the depth direction in FIG. 2 and FIG. 3. In the case where first optical surface 305 is opposite to light emitting element 220, first optical surface 305 allows transmission light emitted from light emitting element 220 to enter optical receptacle 300 while refracting the light. At this time, first optical surface 305 may convert the transmission light emitted from light emitting element 220 into collimated light. In the case where first optical surface 305 is opposite to light receiving element 230, first optical surface 305 emits, toward light receiving element 230, reception light that is entered into optical receptacle 300 from fifth optical surface 325 and is reflected by first reflection surface 330. At this time, first optical surface 305 may converge the reception light.

The shape of first optical surface 305 may be, but not limited to, a flat surface or a curved surface. In the present embodiment, first optical surface 305 is a convex lens surface protruding toward photoelectric conversion device 200. In addition, first optical surface 305 has a circular shape in plan view. Preferably, the central axis of first optical surface 305 is perpendicular to the light emitting surface of light emitting element 220 or the light receiving surface of light receiving element 230. In addition, preferably, the central axis of first optical surface 305 matches the optical axis of the transmission light emitted from light emitting element 220 or the optical axis of the reception light detected by light receiving element 220.

Four second optical surfaces 310 are disposed in the first surface (bottom surface) of optical receptacle 300 in a line in parallel to the line of first optical surfaces 305. Four second optical surfaces 310 are disposed in a line in the depth direction in FIG. 2 and FIG. 3. In the case where second optical surface 310 is opposite to light emitting element 220, second optical surface 310 allows the transmission light emitted from light emitting element 220 to enter optical receptacle 300 while refracting the light. At this time, second optical surface 310 may convert the transmission light emitted from light emitting element 220 into collimated light. In the case where second optical surface 310 is opposite to light receiving element 230, second optical surface 310 emits, toward light receiving element 230, the reception light that is entered into optical receptacle 300 from fourth optical surface 320 and is reflected by second reflection surface 335. At this time, second optical surface 310 may converge the reception light.

The shape of second optical surface 310 may be, but not limited to, a flat surface or a curved surface. In the present embodiment, second optical surface 310 is a convex lens surface protruding toward photoelectric conversion device 200. In addition, second optical surface 310 has a circular shape in plan view. Preferably, the central axis of second optical surface 310 is perpendicular to the light emitting surface of light emitting element 220 or the light receiving surface of light receiving element 230. In addition, preferably, the central axis of second optical surface 310 matches the optical axis of the transmission light emitted from light emitting element 220 or the optical axis of the reception light detected by light receiving element 220.

Four third optical surfaces 315 are disposed in the first surface (bottom surface) of optical receptacle 300 in a line in parallel to the line of first optical surfaces 305. Four third optical surfaces 315 are disposed in a line in the depth direction in FIG. 2 and FIG. 3. In the case where third optical surface 315 is opposite to light emitting element 220, third optical surface 315 allows the transmission light emitted from light emitting element 220 to enter optical receptacle 300 while refracting the light. At this time, third optical surface 315 may convert the transmission light emitted from light emitting element 220 into collimated light. In the case where third optical surface 315 is opposite to light receiving element 230, third optical surface 315 emits, toward light receiving element 230, the reception light that is entered into optical receptacle 300 from fifth optical surface 325 and is reflected by inclined surface 340. At this time, third optical surface 315 may converge the reception light.

The shape of third optical surface 315 may be, but not limited to, a flat surface or a curved surface. In the present embodiment, third optical surface 315 is a convex lens surface protruding toward photoelectric conversion device 200. In addition, third optical surface 315 has a circular shape in plan view. Preferably, the central axis of third optical surface 315 is perpendicular to the light emitting surface of light emitting element 220 or the light receiving surface of light receiving element 230. In addition, preferably, the central axis of third optical surface 315 matches the optical axis of the transmission light emitted from light emitting element 220 or the optical axis of the reception light detected by light receiving element 220.

Four fourth optical surfaces 320 are disposed in the second surface (front surface) of optical receptacle 300 in a line. Four fourth optical surfaces 320 are disposed in a line in the depth direction in FIG. 2 and FIG. 3. In the case where fourth optical surface 320 is opposite to the end surface of transmitting optical transmission member 410, fourth optical surface 320 emits, toward the end surface of transmitting optical transmission member 410, the transmission light that is entered into optical receptacle 300 from second optical surface 310 and is reflected by second reflection surface 335. At this time, fourth optical surface 320 may converge the transmission light. In the case where fourth optical surface 320 is opposite to receiving optical transmission member 420, fourth optical surface 320 allows, to enter optical receptacle 300, the reception light emitted from the end surface of transmitting optical transmission member 410 while refracting the light. At this time, fourth optical surface 320 may convert, into collimated light, the reception light emitted from the end surface of transmitting optical transmission member 410.

The shape of fourth optical surface 320 may be, but not limited to, a flat surface or a curved surface. In the present embodiment, fourth optical surface 320 is a convex lens surface protruding toward the end surfaces of optical transmission members 410 and 420. In addition, fourth optical surface 320 has a circular shape in plan view. Preferably, the central axis of fourth optical surface 320 is perpendicular to the end surfaces of optical transmission members 410 and 420. In addition, preferably, the central axis of fourth optical surface 320 matches the central axes of the end surfaces of optical transmission members 410 and 420.

Four fifth optical surfaces 325 are disposed in the second surface (front surface) of optical receptacle 300 in a line in parallel to the line of fourth optical surfaces 325. Four fifth optical surfaces 325 are disposed in a line in the depth direction in FIG. 2 and FIG. 3. In the case where fifth optical surface 325 is opposite to the end surface of transmitting optical transmission member 410, fifth optical surface 325 emits, toward the end surface of transmitting optical transmission member 410, the transmission light that is entered into optical receptacle 300 from first optical surface 305 and is reflected by first reflection surface 330, or the transmission light that is entered into optical receptacle 300 from third optical surface 315 and is reflected by inclined surface 340. At this time, fifth optical surface 325 may converge the transmission light. In the case where fifth optical surface 325 is opposite to receiving optical transmission member 420, fifth optical surface 325 allows, to enter optical receptacle 300, the reception light emitted from the end surface of transmitting optical transmission member 410 while refracting the light. At this time, fifth optical surface 325 may convert, into collimated light, the reception light emitted from the end surface of transmitting optical transmission member 410.

The shape of fifth optical surface 325 may be, but not limited to, a flat surface or a curved surface. In the present embodiment, fifth optical surface 325 is a convex lens surface protruding toward the end surfaces of optical transmission members 410 and 420. In addition, fifth optical surface 325 has a circular shape in plan view. Preferably, the central axis of fifth optical surface 325 is perpendicular to the end surfaces of optical transmission members 410 and 420. In addition, preferably, the central axis of fifth optical surface 325 matches the central axes of the end surfaces of optical transmission members 410 and 420.

First reflection surface 330 is an inclined surface disposed on the light path between first optical surface 305 and fifth optical surface 325. First reflection surface 330 reflects, toward fifth optical surface 325, the light entered from first optical surface 305. In addition, first reflection surface 330 reflects, toward first optical surface 305, the light that is entered from fifth optical surface 325 and is transmitted through inclined surface 340. First reflection surface 330 is tilted such that it comes closer to fourth optical surface 320 and fifth optical surface 325 (the front surface of optical receptacle 300) in the direction from the bottom surface (first surface) toward the top surface of optical receptacle 300. The inclination angle of first reflection surface 330 is not limited. In the present embodiment, the inclination angle of first reflection surface 330 is 45° with respect to the optical axis of the light (transmission light or reception light) incident on first reflection surface 330. The shape of first reflection surface 330 may be, but not limited to, a flat surface or a curved surface. In the present embodiment, first reflection surface 330 is a flat surface. Transmission light or reception light impinges on first reflection surface 330 at an angle larger than the critical angle.

Second reflection surface 335 is an inclined surface disposed on the light path between second optical surface 310 and fourth optical surface 320. Second reflection surface 335 reflects, toward fourth optical surface 320, the light entered from second optical surface 310. In addition, second reflection surface 335 reflects, toward second optical surface 310, the light entered from fourth optical surface 320. Second reflection surface 335 is tilted such that it comes closer to fourth optical surface 320 and fifth optical surface 325 (the front surface of optical receptacle 300) in the direction from the bottom surface (first surface) toward the top surface of optical receptacle 300. The inclination angle of second reflection surface 335 is not limited. In the present embodiment, the inclination angle of second reflection surface 335 is 45° with respect to the optical axis of the light (transmission light or reception light) incident on second reflection surface 335. The shape of second reflection surface 335 may be, but not limited to, a flat surface or a curved surface. In the present embodiment, second reflection surface 335 is a flat surface. Transmission light or reception light impinges on second reflection surface 335 at an angle larger than the critical angle.

While first reflection surface 330 and second reflection surface 335 are connected to each other so as to form one flat surface in the example illustrated in FIG. 2 and FIG. 3, first reflection surface 330 and second reflection surface 335 may be separated from each other. In addition, a reflection film composed of a thin film of a metal with a high optical reflectivity (such as Al, Ag and Au) may be formed on first reflection surface 330 and second reflection surface 335. When a higher priority is given to reduction in number of components, it is preferable to employ a configuration using only the total reflection as first reflection surface 330 and second reflection surface 335.

Inclined surface 340 is an inclined surface disposed between first reflection surface 330 and fifth optical surface 340 on the light path between first optical surface 305 and fifth optical surface 325. Inclined surface 340 is tilted such that it comes closer to fourth optical surface 320 and fifth optical surface 325 (the front surface of optical receptacle 300) in the direction from the bottom surface (first surface) toward the top surface of optical receptacle 300. The inclination angle of inclined surface 340 is not limited. In the present embodiment, the inclination angle of inclined surface 340 is 45° with respect to the optical axis of the light (transmission light or reception light) incident on inclined surface 340. The shape of inclined surface 340 may be, but not limited to, a flat surface or a curved surface. In the present embodiment, inclined surface 340 is a flat surface. Transmission light or reception light impinges on inclined surface 340 at an angle larger than the critical angle.

Inclined surface 340 functions as a transmission surface when covered with optically transparent material 360, and functions as a reflection surface when not covered with optically transparent material 360. In the present embodiment, inclined surface 340 is an inner surface of recess 345, and functions as a transmission surface when recess 345 is filled with optically transparent material 360 (see FIG. 2), while functioning as a reflection surface when recess 345 is not filled with optically transparent material 360 (see FIG. 3).

As illustrated in FIG. 2, inclined surface 340 functioning as the transmission surface allows, to pass therethrough toward first reflection surface 330, the light entered from fifth optical surface 325. In addition, inclined surface 340 functioning as the transmission surface allows, to pass therethrough toward fifth optical surface 325, the light that is entered from first optical surface 305 and is reflected by first reflection surface 330. On the other hand, as illustrated in FIG. 3, inclined surface 340 functioning as the reflection surface reflects, toward the fifth optical surface, the light entered from third optical surface 315. In addition, inclined surface 340 functioning as the reflection surface reflects, toward third optical surface 315, the light entered from fifth optical surface 325.

Optically transparent material 360 is used for switching the function of inclined surface 340. Specifically, when inclined surface 340 is used as the reflection surface, optically transparent material 360 is not used (see FIG. 3). When inclined surface 340 is used as the transmission surface, optically transparent material 360 is provided on inclined surface 340 to limit the reflection (especially total reflection). In the present embodiment, optically transparent material 360 is provided so as to fill recess 345 (see FIG. 2).

The type of optically transparent material 360 is not limited as long as the material is optically transparent to the light of the wavelength used in the optical communication. In terms of usability, it is preferable that optically transparent material 360 be a material that is solidified when in use while having a liquid form at the time when the material is provided to inclined surface 340. Examples of optically transparent material 360 include urethane acrylate, acrylate, and epoxy resin. In terms of reducing the refraction at inclined surface 340, preferably, optically transparent material 360 has a refractive index close to that of the material of optical receptacle 300, or more preferably, optically transparent material 360 has a refractive index identical to that of the material of optical receptacle 300.

Usage of Optical Receptacle

Next, a usage of optical receptacle 300 is described. Here, it is assumed to use photoelectric conversion device 200 in which four light emitting elements 220 are nearer to optical transmission members 410 and 420 than four light receiving elements 230.

First, as illustrated in FIG. 2, a case is described in which an optical connector including four transmitting optical transmission members 410 disposed on the upper side and four receiving optical transmission members 420 disposed on the lower side is attached to optical receptacle 300. In this case, optical receptacle 300 is positioned on substrate 210 such that four light emitting elements 220 are opposite to respective four second optical surfaces 310 and four light receiving elements 230 are opposite to respective four first optical surfaces 305.

In this case, recess 345 of optical receptacle 300 is filled with optically transparent material 360, and inclined surface 340 functions as the transmission surface. Accordingly, the reception light emitted from the end surface of receiving optical transmission member 420 enters optical receptacle 300 from fifth optical surface 325, passes through inclined surface 340, and is then reflected by first reflection surface 330 so as to be emitted from first optical surface 305 toward light receiving element 230. In other words, light receiving element 230 and the end surface of receiving optical transmission member 420 are optically coupled with each other. In addition, the transmission light emitted from light emitting element 220 enters optical receptacle 300 from second optical surface 310 so as to be reflected by second reflection surface 335, and passes through first transmission surface 350 and second transmission surface 355 so as to be emitted from fourth optical surface 320 toward the end surface of transmitting optical transmission member 410. In other words, light emitting element 220 and the end surface of transmitting optical transmission member 410 are optically coupled with each other. Note that, in this mode, third optical surface 315 is not used.

Next, as illustrated in FIG. 3, a case is described in which an optical connector including four transmitting optical transmission members 410 disposed on the lower side and four receiving optical transmission members 420 disposed on the upper side is attached to optical receptacle 300. In this case, optical receptacle 300 is positioned on substrate 210 such that four light emitting elements 220 are opposite to respective four third optical surfaces 315 and four light receiving elements 230 are opposite to respective four second optical surfaces 310.

In this case, recess 345 of optical receptacle 300 is not filled with optically transparent material 360, and inclined surface 340 functions as a reflection surface. Accordingly, the transmission light emitted from light emitting element 220 enters optical receptacle 300 from third optical surface 315 so as to be reflected by inclined surface 340 and emitted from fifth optical surface 325 toward the end surface of transmitting optical transmission member 410. In other words, light emitting element 220 and the end surface of transmitting optical transmission member 410 are optically coupled with each other. In addition, the reception light emitted from the end surface of receiving optical transmission member 420 enters optical receptacle 300 from fourth optical surface 320 and passes through second transmission surface 355 and first transmission surface 350 so as to be reflected by second reflection surface 335 and emitted by second optical surface 310 toward light receiving element 230. In other words, light receiving element 230 and the end surface of receiving optical transmission member 420 are optically coupled with each other. Note that, in this mode, first optical surface 305 is not used.

As described above, with optical receptacle 300 according to the present embodiment, light emitting element 220 and the end surface of transmitting optical transmission member 410 can be optically coupled with each other and light receiving element 230 and the end surface of receiving optical transmission member 420 can be optically coupled with each other without changing the configuration of photoelectric conversion device 200 even when the positions of transmitting optical transmission member 410 and receiving optical transmission member 420 are changed.

Effect

As described above, optical receptacle 300 according to the present embodiment switches the function of inclined surface 340 by using or not using optically transparent material 360, and thus light emitting element 220 and the end surface of transmitting optical transmission member 410 can be optically coupled with each other and light receiving element 230 and the end surface of receiving optical transmission member 420 can be optically coupled with each other without changing the configuration of photoelectric conversion device 200 even when the positions of transmitting optical transmission member 410 and receiving optical transmission member 420 are changed.

Note that, in the present embodiment, the numbers of light emitting elements 220, light receiving elements 230, first optical surfaces 305, second optical surfaces 310, third optical surfaces 315, fourth optical surfaces 320, fifth optical surfaces 325, transmitting optical transmission members 410 and receiving optical transmission members 420 are each four, but the numbers of them are not limited. The number of each of light emitting elements 220, light receiving elements 230, first optical surfaces 305, second optical surfaces 310, third optical surfaces 315, fourth optical surfaces 320, fifth optical surfaces 325, transmitting optical transmission members 410 and receiving optical transmission members 420 may be one or more.

While the three lines of the optical surfaces (the line of first optical surfaces 305, the line of second optical surfaces 310 and the line of third optical surfaces 315) are disposed in the first surface (bottom surface) of optical receptacle 300, and the two lines of the optical surfaces (the line of fourth optical surfaces 320 and the line of fifth optical surfaces 325) are disposed in the second surface (front surface) of optical receptacle 300 in the present embodiment, the number of the lines of the optical surfaces in the first surface and the number of the lines of the optical surfaces in the second surface are not limited. For example, the number of the lines of the optical surfaces in the first surface may be four or more, and the number of the lines of the optical surfaces in the second surface may be three or more. Then, the position and size of the inclined surface 340 may be appropriately changed in accordance with the object. Normally, the number of the lines of the optical surfaces of the first surface is greater than the number of the lines of the optical surfaces of the second surface.

This application claims the right of priority based on application for patent 2017-126188 of application on Jun. 28, 2017, the disclosure each of which including the specification, drawings and abstract is incorporated herein by reference in its entirety.

INDUSTRIAL APPLICABILITY

The optical receptacle and the optical module according to the embodiment of the present invention are suitable for optical communications using an optical transmission member, for example.

REFERENCE SIGNS LIST

10 Optical module (Optical transceiver)
20 Photoelectric conversion device
21 Substrate
22 Light emitting element (VCSEL)
23 Light receiving element (PD) for automatic light quantity control
24 Receiving light receiving element (PD)
30 Optical receptacle (Optical member)
31 Collimator lens
32 Total reflection mirror
33 Condenser lens
34 Collimator lens
35 Condenser lens
41 Receiving optical fiber
42 Transmitting optical fiber
100 Optical module
200 Photoelectric conversion device
210 Substrate
220 Light emitting element
230 Light receiving element
300 Optical receptacle
305 First optical surface
310 Second optical surface
315 Third optical surface
320 Fourth optical surface
325 Fifth optical surface
330 First reflection surface
335 Second reflection surface
340 Inclined surface
345 Recess
350 First transmission surface
355 Second transmission surface
360 Optically transparent material
410 Transmitting optical transmission member
420 Receiving optical transmission member

What is claimed is:

1. An optical receptacle for optically coupling a light emitting element or a light receiving element of a photoelectric conversion device and an end surface of at least one optical transmission member when the optical receptacle is disposed between the photoelectric conversion device and the at least one optical transmission member, the optical receptacle comprising:

at least one first optical surface disposed in a first surface, the first surface being opposite to the photoelectric conversion device when the optical receptacle is disposed between the photoelectric conversion device and the at least one optical transmission member;

at least one second optical surface disposed in the first surface;

at least one third optical surface disposed in the first surface;

at least one fourth optical surface disposed in a second surface, the second surface being opposite to the at least one optical transmission member when the optical receptacle is disposed between the photoelectric conversion device and the at least one optical transmission member;

at least one fifth optical surface disposed in the second surface;

a first reflection surface disposed on a light path between the first optical surface and the fifth optical surface, the first reflection surface being configured to reflect, toward the fifth optical surface, light entered from the first optical surface, or reflect, toward the first optical surface, light entered from the fifth optical surface;

a second reflection surface disposed on a light path between the second optical surface and the fourth optical surface, the second reflection surface being configured to reflect, toward the fourth optical surface, light entered from the second optical surface, or reflect, toward the second optical surface, light entered from the fourth optical surface; and an inclined surface disposed between the first reflection surface and the fifth optical surface on the light path between the first optical surface and the fifth optical surface, the inclined surface being tilted such that the inclined surface comes closer to the second surface as a distance of the inclined surface from the first surface increases, wherein the inclined surface functions as a transmission surface when the inclined surface is covered with an optically transparent material, wherein the inclined surface functions as a reflection surface when the inclined surface is not covered with the optically transparent material, wherein, when the inclined surface functions as the reflection surface, the inclined surface reflects, toward the fifth optical surface, light entered from the third optical surface, and reflects, toward the third optical surface, the light entered from the fifth optical surface, and wherein, when the inclined surface functions as the transmission surface, the inclined surface allows, to pass through the inclined surface toward the fifth optical surface, light entered from the first optical surface and reflected by the first reflection surface, and allows, to pass through the inclined surface toward the first reflection surface, the light entered from the fifth optical surface.

2. The optical receptacle according to claim 1, wherein the at least one first optical surface is a plurality of first optical surfaces, the plurality of first optical surfaces being disposed in a line in the first surface, wherein the at least one second optical surface is a plurality of second optical surfaces, the plurality of second optical surfaces being disposed in a line in the first surface in parallel to a line of the plurality of first optical surfaces, wherein the at least one third optical surface is a plurality of third optical surfaces, the plurality of third optical surfaces being disposed in a line in the first surface in parallel to a line of the plurality of first optical surfaces, wherein the at least one fourth optical surface is a plurality of fourth optical surfaces, the plurality of fourth optical surfaces being disposed in a line in the second surface, and wherein the at least one fifth optical surface is a plurality of fifth optical surfaces, the plurality of fifth optical surfaces being disposed in a line in the second surface in parallel to a line of the plurality of fifth optical surfaces.

3. The optical receptacle according to claim 1, wherein the inclined surface is an inner surface of a recess formed in the optical receptacle.

4. An optical module comprising:

a photoelectric conversion device including
a substrate,
at least one light emitting element disposed on the substrate, and
at least one light receiving element disposed on the substrate; and the optical receptacle according to claim 1.

5. The optical module according to claim 4, wherein the at least one light emitting element is a plurality of light emitting elements, the plurality of light emitting elements being disposed in a line on the substrate, wherein the at least one light receiving element is a plurality of light receiving elements, the plurality of light receiving elements being disposed in a line on the substrate in parallel to a line of the plurality of light emitting elements, wherein the at least one first optical surface is a plurality of first optical surfaces, the plurality of first optical surfaces being disposed in a line in the first surface, wherein the at least one second optical surface is a plurality of second optical surfaces, the plurality of second optical surfaces being disposed in a line in the first surface in parallel to a line of the plurality of first optical surfaces, wherein the at least one third optical surface is a plurality of third optical surfaces, the plurality of third optical surfaces being disposed in a line in the first surface in parallel to a line of the plurality of first optical surfaces, and wherein the line of the plurality of light emitting elements, a line of the plurality of light receiving elements, the line of the plurality of first optical surfaces, a line of the plurality of second optical surfaces and a line of the plurality of third optical surfaces are parallel to each other.

\* \* \* \* \*